June 30, 1964 — H. G. IRWIN — 3,139,023
GASEOUS-CONDIMENT GENERATOR
Filed June 4, 1962 — 7 Sheets-Sheet 1
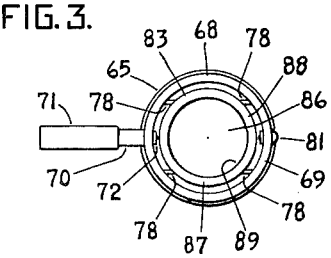
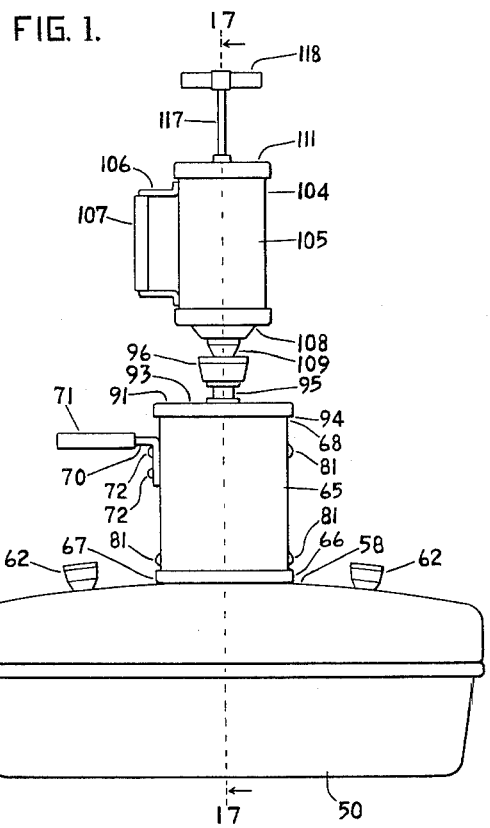
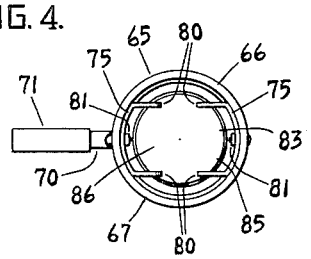
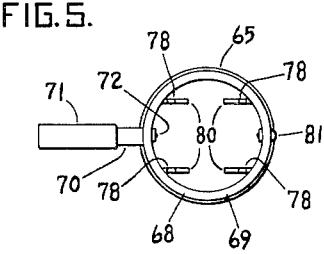
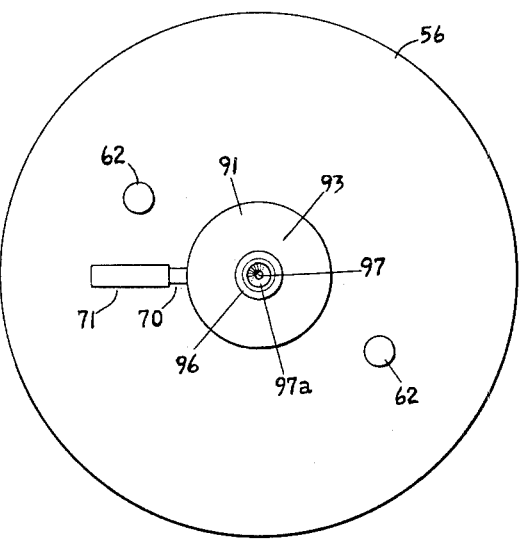
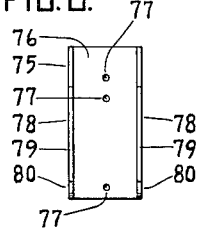
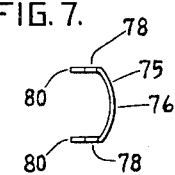

June 30, 1964  H. G. IRWIN  3,139,023
GASEOUS-CONDIMENT GENERATOR
Filed June 4, 1962  7 Sheets-Sheet 2

FIG. 11.
FIG. 14. 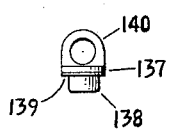   FIG. 15. 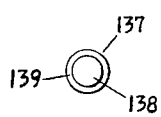   FIG. 16. 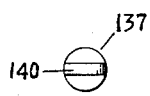

June 30, 1964 H. G. IRWIN 3,139,023
GASEOUS-CONDIMENT GENERATOR
Filed June 4, 1962 7 Sheets-Sheet 3
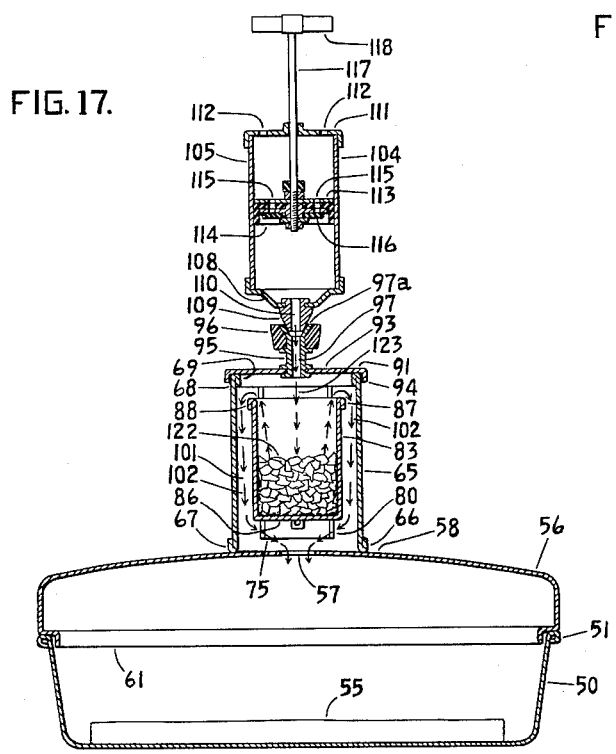
FIG. 17.
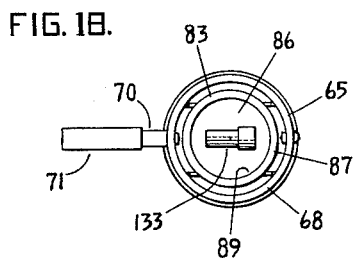
FIG. 18.
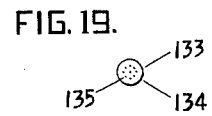
FIG. 19.
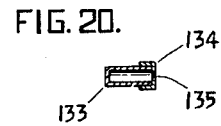
FIG. 20.
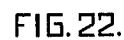
FIG. 22.
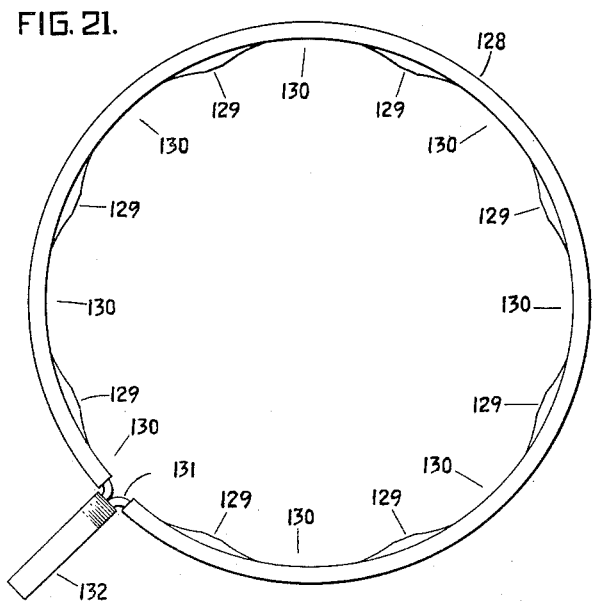
FIG. 21.
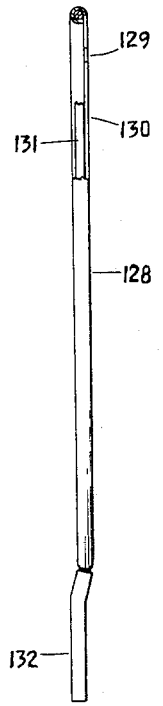

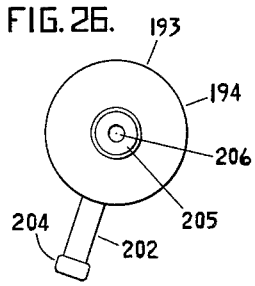
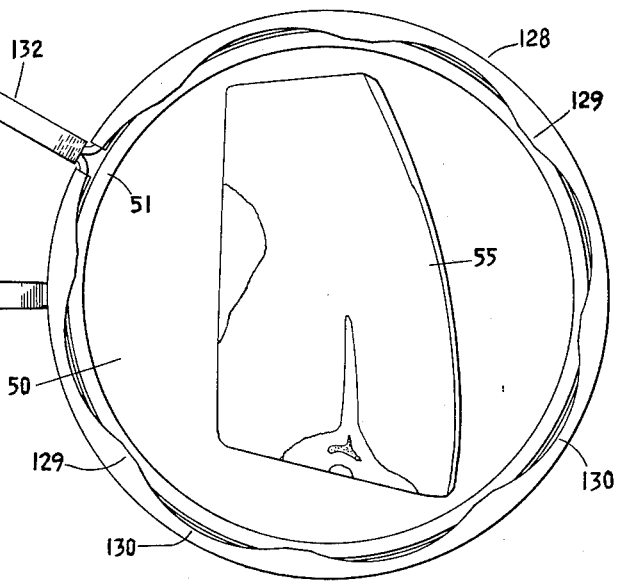
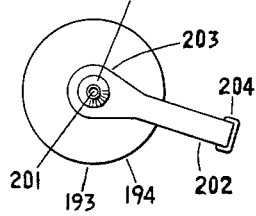
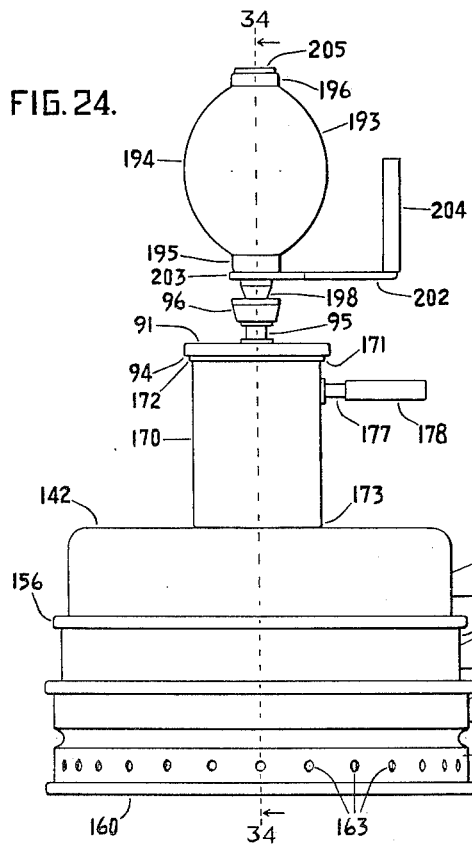
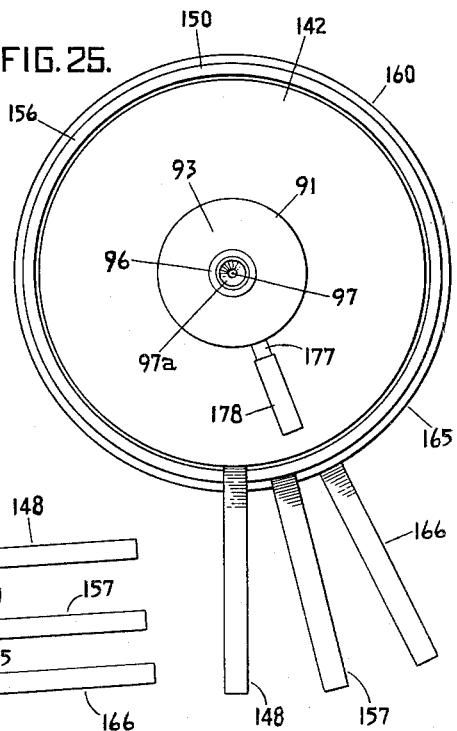

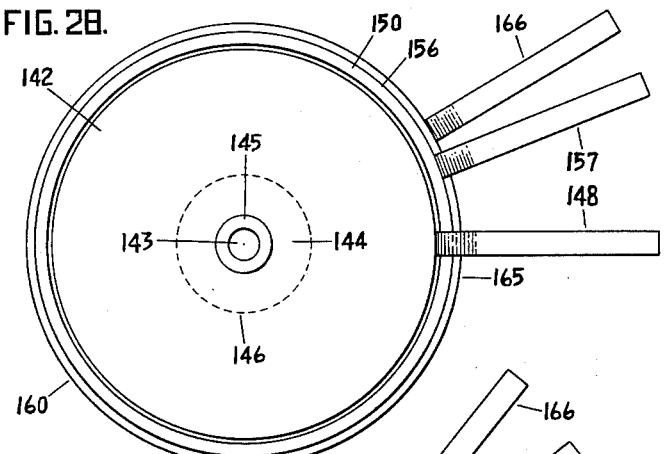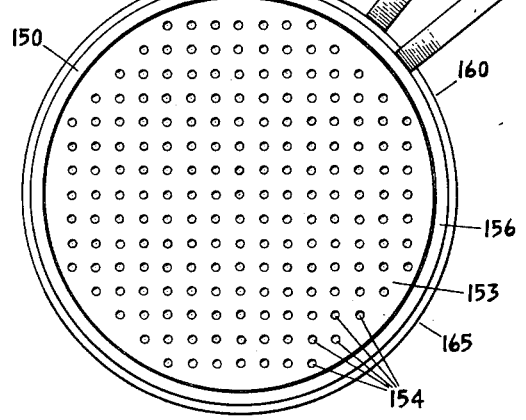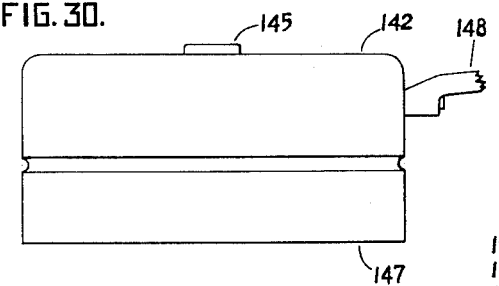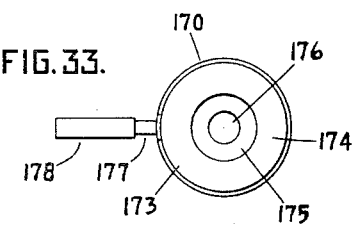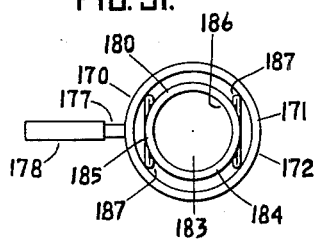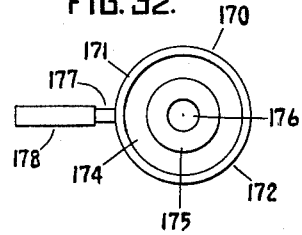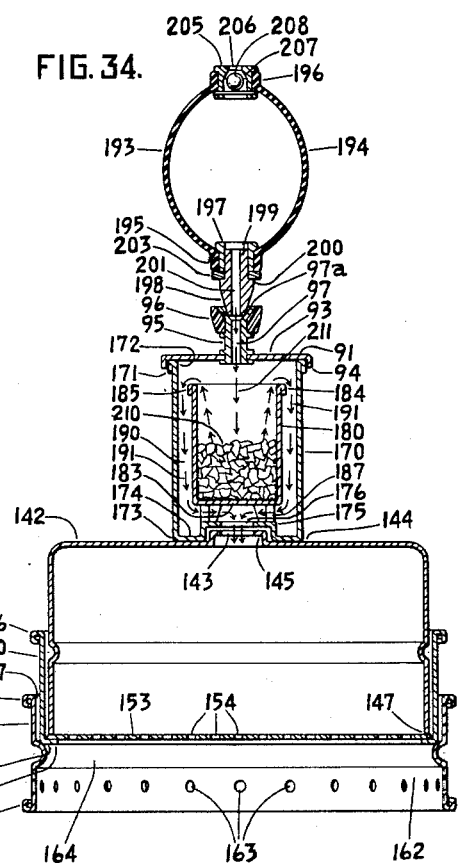

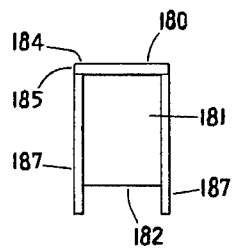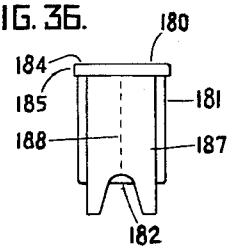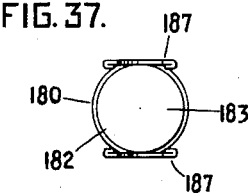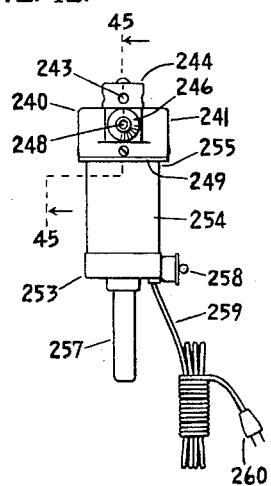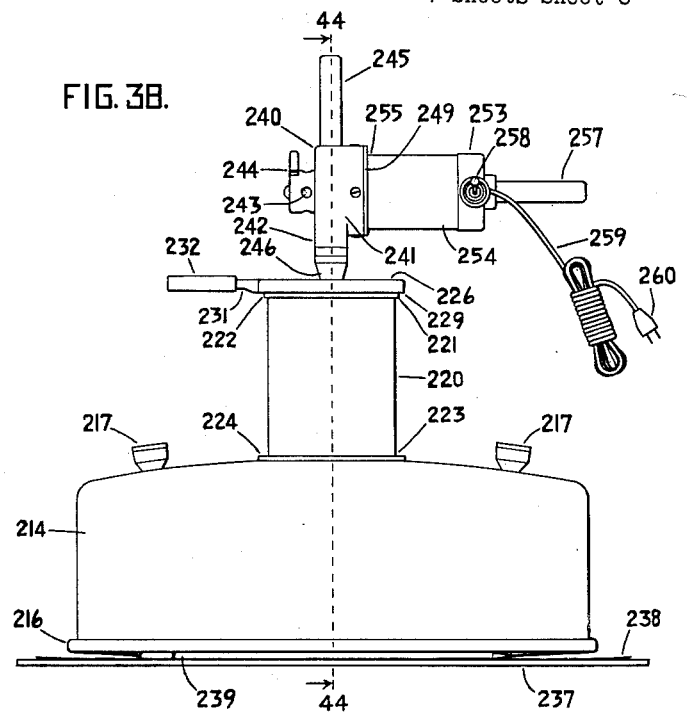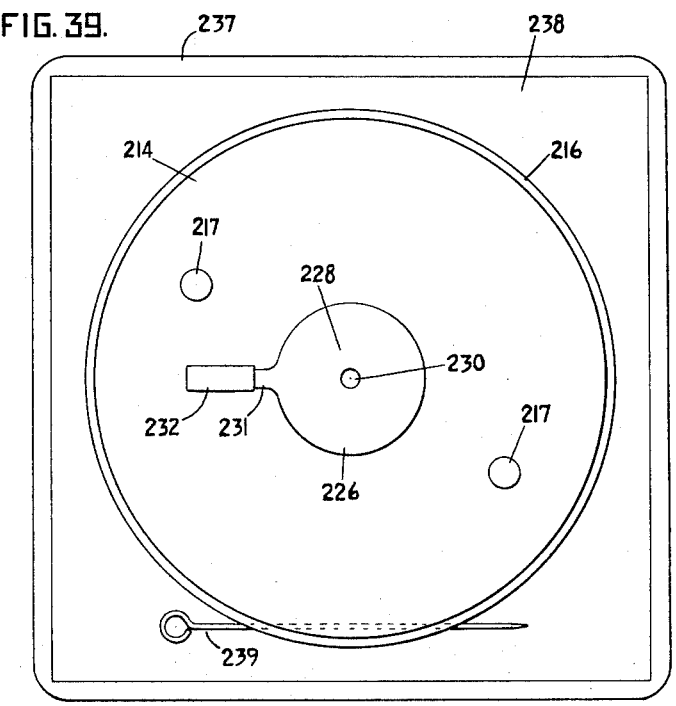

June 30, 1964  H. G. IRWIN  3,139,023
GASEOUS-CONDIMENT GENERATOR
Filed June 4, 1962  7 Sheets-Sheet 7
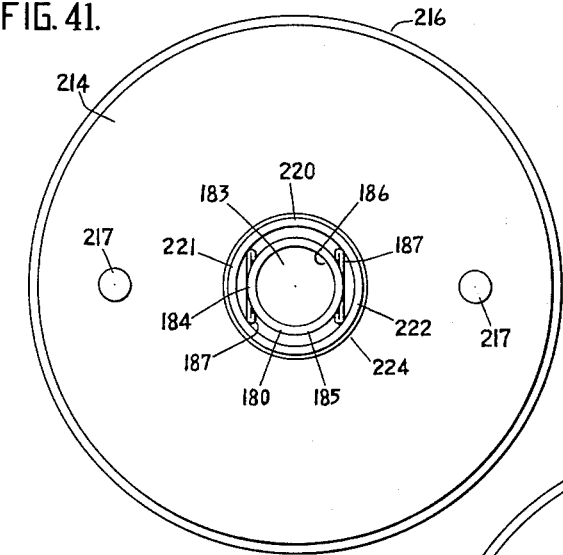
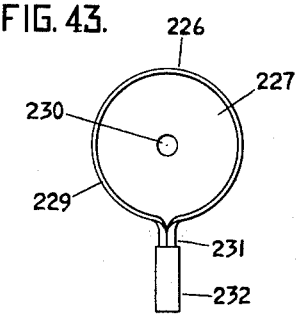
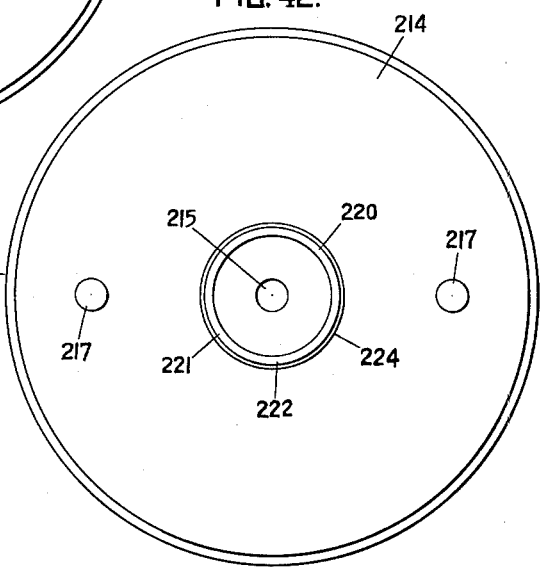
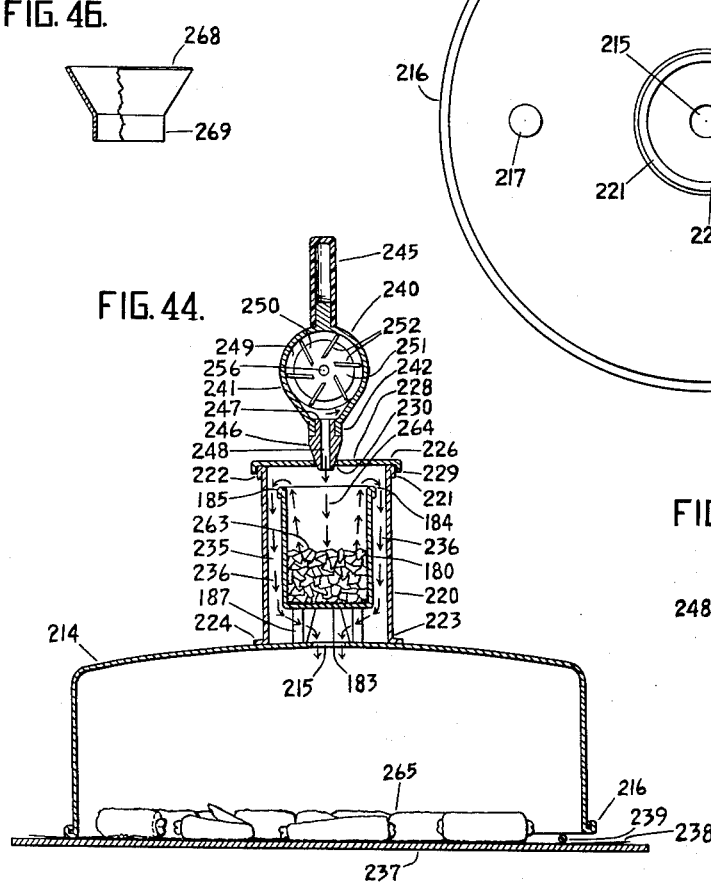
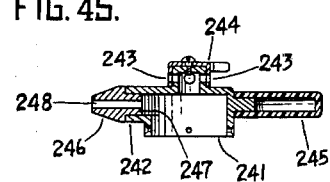

United States Patent Office 3,139,023
Patented June 30, 1964

3,139,023
GASEOUS-CONDIMENT GENERATOR
Herbert G. Irwin, Box G, Noble, La.
Filed June 4, 1962, Ser. No. 199,792
3 Claims. (Cl. 99—260)

This invention relates to a gaseous-condiment generator, and contemplates a gaseous-condiment generator including a brasier in a brasier casing on a food cover, whereby food can be covered with the food cover and given a pleasant flavor with gaseous condiment generated by burning and/or vaporizing suitable gaseous condiment generating material in the brasier.

Other objects and advantages of this invention will appear throughout the following specification and claims.

This application constitutes a continuation in part of my pending application Serial No. 34,801 filed June 8, 1960, relating to Gaseous-Condiment Generator.

In the drawing accompanying and forming a part of this specification.

FIGURE 1 is an elevational view of a gaseous-condiment generator constructed in accordance with the present invention and including a brasier in a covered removable brasier casing on a food cover. The food cover is set up on a frying pan which will hold food under the food cover, and a brasier-fire blower has an air jet in an air jet inlet hole through the brasier casing cover.

FIGURE 2 is a top view of the form of food cover and brasier casing cover shown in FIGURE 1. The food cover as shown is supported on the frying pan. The brasier casing cover as shown is supported on the brasier casing seated on the food cover, but the brasier-fire blower air jet is removed from the air jet inlet hole through the brasier casing cover.

FIGURE 3 is an upper end view of the form of brasier casing shown on the food cover in FIGURE 1. The brasier casing as shown is removed from the food cover, and the brasier casing cover is removed from the brasier casing to afford an upper end view of the brasier in the brasier casing.

FIGURE 4 is a lower end view of the form of brasier casing and brasier shown in FIGURE 3.

FIGURE 5 is a view similar to FIGURE 3, but the brasier is removed from the brasier casing to afford a better view of the brasier supports in the brasier casing.

FIGURE 6 is an edge view of one of the detachable brasier supports shown in the brasier casing in FIGURES 3, 4 and 5. The brasier support as shown is detached from the brasier casing.

FIGURE 7 is an upper end view of the detached brasier support shown in FIGURE 6.

FIGURE 11 is an air jet end view of the form of brasier-fire blower shown in FIGURE 1. The brasier-fire blower air jet as shown is removed from the air jet inlet hole through the brasier casing cover.

FIGURE 14 is an elevational view of a vapor-passageway plug.

FIGURE 15 is a lower end view of the form of plug shown in FIGURE 14.

FIGURE 16 is an upper end view of the form of plug shown in FIGURES 14 and 15.

FIGURE 17 is a sectional view taken on line 17—17 of FIGURE 1.

FIGURE 18 is a view similar to FIGURE 3, but in the brasier lying on the bottom of the brasier a vaporizer tube is shown.

FIGURE 19 is a cap-end view of the vaporizer tube. The tube as shown is removed from the brasier.

FIGURE 20 is a longitudinal sectional view of the vaporizer tube.

FIGURE 21 is an under face view of a food cover vent ring which can be placed on the rim of the frying pan.

FIGURE 22 is an edge view of the form of vent ring shown in FIGURE 21. A portion of the ring is cut away to afford an edge view of one of the spacer points.

FIGURE 23 is an upper face view of the form of vent ring shown in FIGURES 21 and 22. The vent ring as shown is placed on the rim of the frying pan.

FIGURE 24 is an elevational view of a gaseous-condiment generator constructed in accordance with the present invention and including modification of a removable brasier casing having a bottom at the lower end seated on a food cover. The food cover as shown is set in a food holder having a removable perforated bottom, and the food holder is set in a food-holder support.

Figure 8:
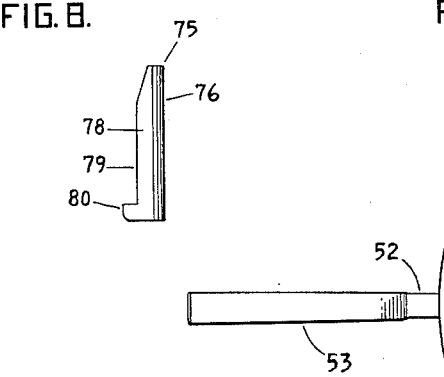
FIGURE 8 is a side view of the detached brasier support shown in FIGURES 6 and 7.
Figure 12:
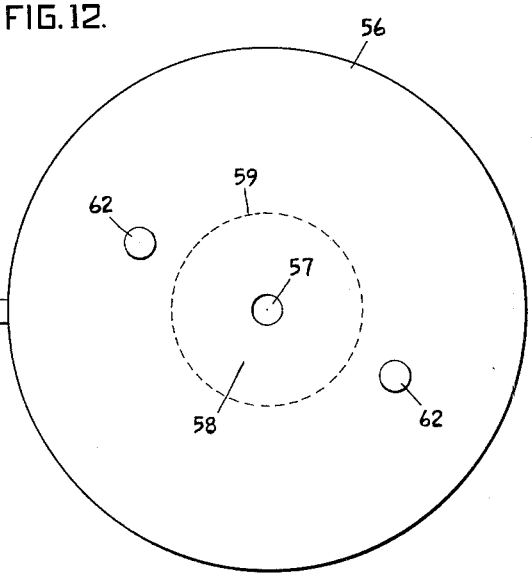
FIGURE 12 is a top view of the form of food cover shown in FIGURES 1 and 2. The food cover as shown is supported on the frying pan, but the brasier casing is removed from the food cover to afford a view of the brasier casing seat around the vapor passageway through the food cover.

FIGURE 25 is a top view of the form of food cover and brasier casing cover shown in FIGURE 24. The food cover as shown is supported in the food holder which latter is supported in the food-holder support. The brasier casing cover as shown is supported on the brasier casing seated on the food cover, but the brasier-fire blower air jet is removed from the air jet inlet hole through the brasier casing cover.

FIGURE 26 is an upper end view of the form of brasier-fire blower shown in FIGURE 24. The brasier-fire blower as shown is removed from over the brasier casing cover.

FIGURE 27 is an air jet end view of the form of brasier-fire blower shown in FIGURES 24 and 26. The brasier-fire blower air jet as shown is removed from the air jet inlet hole through the brasier casing cover.

FIGURE 28 is a top view of the form of food cover shown in FIGURES 24 and 25. The brasier casing is removed from the food cover to show the brasier casing seat around the vapor passageway through the food cover. The food cover as shown is supported in the food holder which latter is supported in the food-holder support.

FIGURE 29 is an upper rim view of the form of food holder shown in FIGURES 24, 25 and 28. The food holder as shown is supported in the food-holder support.

FIGURE 30 is an elevational view of the form of food cover shown in FIGURES 24, 25 and 28. The food cover as shown is removed from the food holder, and a portion of the handle is broken off.

FIGURE 31 is an upper end view of the form of brasier casing shown on the food cover in FIGURES 24 and 34. The brasier casing as shown is removed from the food cover, and the brasier casing cover is removed from the brasier casing to afford an upper end view of the brasier in the brasier casing.

FIGURE 32 is a view similar to FIGURE 31, but the brasier is removed from the brasier casing.

FIGURE 33 is a lower end view of the form of brasier casing shown in FIGURES 24, 31, 32 and 34. The brasier casing as shown is removed from the food cover, and the brasier casing cover is removed from the brasier casing.

FIGURE 34 is a sectional view taken on broken line 34—34 of FIGURE 24.

FIGURE 35 is an elevational view of the form of brasier shown in FIGURES 31 and 34. The brasier as shown is removed from the brasier casing, and a side portion of the brasier between the two attached brasier supports is shown.

FIGURE 36 is a view similar to FIGURE 35, but a support side of the brasier is shown.

FIGURE 37 is a lower end view of the form of brasier shown in FIGURES 31, 34, 35 and 36. The brasier as shown is removed from the brasier casing.

FIGURE 38 is an elevational view of a gaseous-condiment generator constructed in accordance with the present invention and including further modification of a brasier casing rigid with a food cover. The food cover as shown is set up on a flat food plate which will hold food under the food cover.

FIGURE 39 is a top view of the form of food cover and brasier casing cover shown in FIGURE 38. The food cover as shown is supported on the food plate. The brasier casing cover as shown is supported on the brasier casing, but the brasier-fire blower air jet is removed from the air jet inlet hole through the brasier casing cover.

FIGURE 40 is an air jet end view of the form of brasier-fire blower shown in FIGURE 38. The brasier-fire blower air jet as shown is removed from the air jet inlet hole through the brasier casing cover.

FIGURE 41 is an upper end view of the form of brasier casing rigid with the food cover shown in FIGURES 38 and 39. The brasier casing cover is removed from the brasier casing to afford an upper end view of the brasier in the brasier casing.

FIGURE 42 is a view similar to FIGURE 41, but the brasier is removed from the brasier casing to show the vapor passageway through the food cover.

FIGURE 43 is an under face view of the form of brasier casing cover shown on the brasier casing in FIGURES 38, 39 and 44. The brasier casing cover as shown is removed from the brasier casing.

FIGURE 44 is a sectional view taken on broken line 44—44 of FIGURE 38.

FIGURE 45 is a sectional view of the brasier-fire blower air jet and the larger section of the blower fan case taken on broken line 45—45 of FIGURE 40.

FIGURE 46 is an elevational view, partly cut away, of a funnel for funneling gaseous-condiment generating material into the brasier.

Upon reference to FIGURES 1, 2, 12, 13 and 17 of the drawing it will be noted that 56 indicates a food cover. The food cover has a through vapor passageway 57 shown in FIGURES 12 and 13, a brasier casing seat 58 on the food cover around the vapor passageway through the food cover, which brasier casing seat is the upper surface of the food cover around the passageway 57 outward to the broken circle line 59 shown in FIGURE 12, an under annular seat 60 shown in FIGURE 13, spaced apart knobs 62 and 62 which can be gripped with the fingers of the hands in placing the food cover on the frying pan 50 shown in FIGURES 1 and 17, and an under guide rim 61 to aid in locating the food cover seat 60 on the frying pan rim 51.

On the food cover shown in FIGURES 1 and 2 is a removable brasier casing 65, and the brasier casing removed from the food cover is shown in FIGURES 3, 4 and 5. The brasier casing has a handle 70 provided with a grip 71, a lower end 66 with a rim 67, an upper end 68 with a rim 69, inside brasier supports 75 and 75, and as the brasier casing is shown in FIGURES 1 and 17 the brasier casing lower end is seated on the brasier casing seat 58. The brasier casing lower end fits the brasier casing seat closely all the way around.

Figure 10:
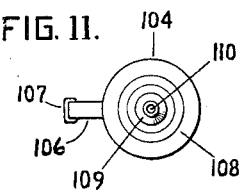
FIGURE 10 is an elevational view of the form of brasier shown in the brasier casing in FIGURES 3 and 4. The brasier as shown is removed from the brasier casing.
Figure 13:
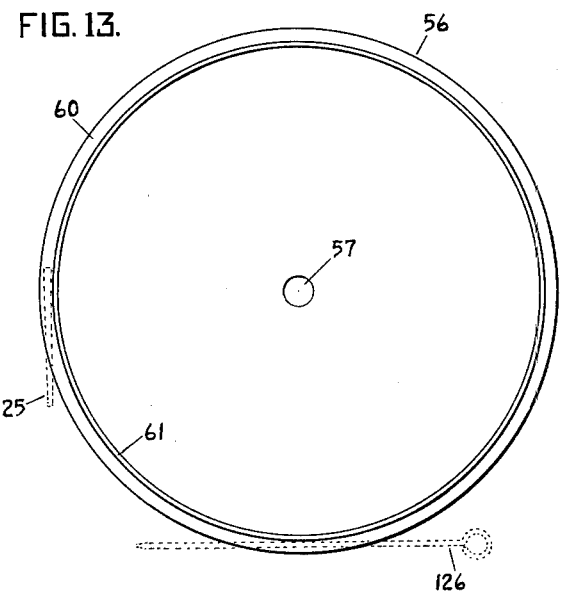
FIGURE 13 is an under face view of the form of food cover shown in FIGURES 1, 2 and 12. The food cover as shown is removed from the frying pan.

In the brasier casing shown in FIGURES 1, 3 and 4 is a removable brasier 83 supported and spaced in the brasier casing on the brasier supports 75 and 75, and the brasier removed from the brasier casing is shown in FIGURE 10. The brasier has a lower end 85 with a bottom 86 shown in FIGURE 4, an upper end 87 with a rim 88 shown in FIGURE 3, and a mouth 89 to receive gaseous-condiment generating material including air into the brasier and to emit gaseous-condiment to flow under the food cover.

Brasier supports 75 and 75 are attached spaced apart to the inside of the brasier casing with attachment bolts 81—81—81 and handle bolts 72—72, and one of the brasier supports removed from the brasier casing is shown in FIGURES 6, 7 and 8. Each brasier support has a back 76 with through attachment-bolt holes 77—77—77, side portions 78 and 78 each of which side portions has an edge 79 to contact the wall 84 of the brasier and a projection 80 at the lower end to extend under the brasier bottom 86 as shown in FIGURE 4.

Figure 9:
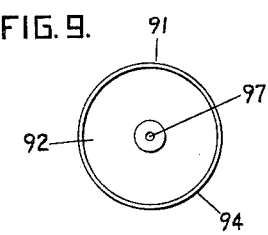
FIGURE 9 is an under face view of the removable brasier casing cover shown on the brasier casing in FIGURES 1 and 2. The cover as shown is removed from the brasier casing.

On the upper end of the brasier casing shown in FIGURE 1 is a removable brasier casing cover 91 also shown in FIGURES 2 and 17, and the brasier casing cover removed from the brasier casing is shown in FIGURE 9. The brasier casing cover has a tubular handle 95 provided with a grip 96, a through air jet inlet hole 97 which is flared at the outer end 97a to receive the brasier-fire blower air jet 109, an under face 92 which fits closely on the upper end of the brasier casing, and a downturned edge portion 94 to aid in locating the cover on the upper end of the brasier casing. Brasier casing cover 91 has an upper face 93 shown in FIGURE 2, and when the brasier casing cover is placed on the upper end of the brasier casing as shown in FIGURES 1 and 17 the brasier casing cover upper face 93 and air jet inlet hole 97—97a are over the bottom 86 of brasier 83.

Out of the brasier 83 to the vapor passageway 57 through the food cover is a vapor passageway 101 shown in FIGURE 17. The two series of arrows 102 and 102 in the passageway 101 indicate the way vapor, gas or air, flows in the passageway 101 to and through the passageway 57.

Brasier-fire blower 104 shown in FIGURES 1, 11 and 17 includes an air-pump cylinder 105 having within the cylinder an air-pump piston 113, and an air jet 109. The air-pump cylinder has a bottom 108 from which the air jet 109 projects, a cylinder cap 111 through which a piston rod 117 extends from the piston 113 to a hand grip 118 on the outer end of the piston rod, a handle 106 with a grip 107 shown in FIGURES 1 and 11. The air-pump piston has a downturned cup member 114 made of suitable flexible material, air passageways 115—115 through the piston, and a flexible disk valve 116 at the lower ends of the air passageways through the piston. Shown in FIGURE 1, the brasier-fire blower extends over the upper face 93 of the brasier casing cover 91, and the brasier-fire blower has the downturned air jet 109 in the air jet inlet hole 97a—97 through the brasier casing cover shown in FIGURE 17.

Brasier-fire blower 104 can be held in the position shown in FIGURE 1 with one hand gripped on the handle grip 107 while the other hand has hold of the piston rod grip 118 to pump air through the air jet orifice 110 into the brasier by moving the pump piston 113 up and down in the cylinder 105. By pumping the brasier-fire blower, enough air can be blown into the brasier 83 to keep a fire of live coals or a charcoal fire burning in the brasier long enough to gas-flavor in the frying pan under the food cover a fried steak 55 with burning-coals gas or burning-charcoal gas from the brasier. A charge of live coals weighing about one ounce to put in the small brasier can be taken from a fire made with any kind of wood suitable for burning to smoke meat for food. A mesh-wire strainer can be used to hold the live coals as they are gathered from the wood fire, and upon removing the brasier casing cover 91 and placing a suitable funnel in the mouth of the brasier 83 the live coals can be poured from the strainer through the funnel into the brasier.

The series of arrows 123 shown in FIGURE 17 indicates the way air flows from the brasier-fire blower air jet 109 to the live coals 122 in the brasier 83, and the two series of arrows 102 and 102 indicate the way burning-coals gas flows out of the brasier to the passageway 57 through the food cover. The food cover is not made to fit air tight on the rim of the frying pan and air inclosed under the food cover can escape between the frying pan rim 51 and the food cover seat 60 as burning-coals gas from the brasier flows by the air feed pressure to and through the passageway 57 and under the food cover into the frying pan where some burning-coals gas flavor will be absorbed on fried food in the frying pan. A flat tooth pick indicated by broken lines 125 in FIGURE 13 can be placed with the wide end of the tooth pick between the food cover seat 60 and the frying pan rim 51 to give vent to air inclosed under the food cover as gas or vapor from the brasier flows under the food cover, or a pin indicated by broken lines 126 placed between the food cover seat and frying pan rim will vent air from under the food cover as gas or vapor flows through the passageway 57. A vent ring 128 shown in FIGURES 21, 22 and shown placed on the rim 51 of the frying pan shown in FIGURE 23 has an annular series of flat spacer points 129, and between the spacer points are notches 130 which will give vent to a full flow of gas or vapor under the food cover. The vent ring spacer points 129 are attached to a wire ring 131 provided with a handle 132.

With the food cover seat and the frying pan rim parted with a tooth pick or a suitable pin, enough burning-coals gas can be generated and moved under the food cover to gas-flavor a fried steak in the frying pan under the food cover by blowing air into the burning coals in the brasier at a moderate rate for about five minutes, and some of a one-ounce charge of burning coals will be burned to ash and the ash deposited on the remaining coals and the bottom of the brasier. Filled full, the small brasier 83 will hold about two ounces by weight of burning coals or ignited charcoal, but a half full charge of about one ounce of coals leaves spatter space to catch particles of ash which the air feed blows from the surface of the top coals. A charge of live coals weighing about one and one-half of an ounce put in the small brasier and air-blown at a rate somewhat above moderate for about five minutes will generate enough burning-coals gas to gas-flavor a fried steak under the food cover in the frying pan, and some fine particles of ash will be included in the gas flow out of the brasier into the frying pan where some of the carried over fine particles of ash will settle on the steak giving the steak a pleasant taste with the burning-coals gas flavor absorbed on the steak.

Charcoal made from wood suitable for burning to smoke meat for food and reduced to pieces of suitable size can be burned in the brasier. The charcoal should be carefully made and carefully handled to avoid any contamination with machinery lubricating oil or grease, and the charcoal should be stored in suitable containers to avoid any contamination in storage. In burning charcoal in the small brasier, the brasier can be charged with a split charge of one-half of the charge (about one-half of an ounce by weight) in new charcoal moistened with water and put in the brasier first, and the other half of the charge (about one-half of an ounce by weight) in ignited left-over charcoal for priming put in the brasier on top of the moistened charcoal. Blowing air into the ignited priming charcoal for about five minutes at a moderate rate will generate enough heat to dry and ignite the new charcoal in the lower half of the charge, and the vapor and gas generated will move by the pressure of the air feed to flow from the brasier and brasier casing through the passageway 57 and under the food cover onto food in the frying pan under the food cover where the flavor of burning-charcoal gas will be absorbed on the food.

Wood smoke can be included in the generation of burning-charcoal gas by including some suitable dry wood made moist with water or some suitable green wood in the first half of a charge of charcoal put in the brasier. Burning-charcoal gas including wood smoke is strong enough to give raw food a smoky flavor, and raw food with some shortening can be put in the frying pan and given a smoky flavor before frying the food. Also, extra flavor in burning-charcoal gas can be obtained by including in the first half of the charge put in the brasier some charcoal treated with suitable wood smoke or some charcoal treated lightly with suitable wood smoke tar.

An electric charcoal-fire starter including a pan having in the pan near the bottom of the pan an exposed heating element to ignite charcoal put in the pan can be used to ignite charcoal for priming to put in the brasier. Charcoal can be put in a stainless steel coarse mesh-wire strainer and placed in contact with a blue flame from a gas or a kerosene cook stove burner to ignite the charcoal to put in the brasier.

New charcoal or dry wood to go in the first half of a charge for the brasier can be put in a mesh-wire strainer and moistened by dipping in clean water.

Usually by the time the priming half of a charge of charcoal has burned to ash the food in the frying pan under the food cover has received sufficient flavor and blowing air into the burning charcoal may be discontinued, leaving the cover on the brasier casing, and the fire in the remaining charcoal will smother out. The smothered-out left-over charcoal can be poured out of the brasier into a suitable strainer to sift out the ash, and the left-over charcoal can be used for priming charcoal. If desired, when the food has received sufficient flavor from a charge of burning charcoal the burning left-over charcoal can be poured out of the brasier into a smothering-can having a cover to smother out the fire, and the left-over charcoal can be saved for priming charcoal.

Heated-earth flavor can be given fried food in the frying pan under the food cover from a small ball or a small cake of moist suitable earth put in the brasier and heated with a charge of left-over charcoal ignited and put in the brasier on the ball or cake of earth and blown with air until some of the vegetable matter in the ball or cake of earth is vaporized. Usually some sandy top soil or some clay subsoil having good flavoring quality can be found under an upland grass meadow, and the earth can be taken and dried and crushed fine enough to dip with a small spoon. A measured quantity of divided clay can be put in a shallow dish and moistened with water and formed into a ball or a cake to put in the brazier, or moist clay can be formed into small lumps to go in the brasier.

Heated-earth flavor can be given fried food in the frying pan under the food cover from a charge of moist suitable earth put in the vaporizer tube 133 shown in FIGURES 18, 19 and 20 and the tube heated on the bottom of the brasier with a charge of ignited left-over charcoal put in the brasier on the tube and blown with air until some of the vegetable matter in the earth in the tube is vaporized. The vapor generated by heating moist earth in the vaporizer tube escapes through the fine perforations 135 in the removable tube cap 134 into the burning-charcoal gas flowing out of the brasier to the food in the frying pan under the food cover where some heated earth flavor will be absorbed on the food. A measured charge of sandy earth can be funneled into the vaporizer tube and moistened with water dropped into the vaporizer tube from a suitable medicine dropper in charging the vaporizer tube to put in the brazier and heated. The vaporizer tube can be made of stainless steel.

The frying pan 50 has a handle 52 with a grip 53 for placing the frying pan over an electric cook stove heating element, or a cook stove gas or kerosene burner, or a charcoal fire or a wood fire, to fry food in the frying pan.

Food cover 58 with the passageway 57 closed can be used for a frying pan cover on frying pan 50 while frying food in the frying pan. Plug 137 shown in FIGURES 14, 15 and 16 has a lower end portion 138 sized to fit in the passageway 57 through the food cover, a flange 139 to seat on the rim around the passageway 57, an upper ring 140 for a handle, and the plug end portion 138 can be inserted in the passageway 57 in adapting the food cover 56 for covering the frying pan while frying food in the frying pan.

Food cover 56 can be used to cover food in an electric frying pan having a rim to fit the seat 60, or the food cover can be made with a seat to fit on the rim of an electric frying pan, and food in an electric frying pan can be given a pleasant flavor with gaseous-condiment generated in the brasier in the brasier casing seated on the food cover.

Brasier 83 and supports 75—75, brasier casing 65 and handle 70, brasier casing cover 91 and handle 95, and frying pan 50, can be made of suitable iron, or made of suitable steel or stainless steel. Grips 71, 96, 107 and knobs 62—62 can be made of suitable plastic, or made of suitable heat insulating material. The food cover 56 can be made of suitable steel or stainless steel. A food cover for use on a cast-iron skillet can be made of suitable cast iron or made of suitable steel. Food cover 56, brasier casing 65 and brasier 83 are made seamless, but a useful food cover, brasier casing, or brasier, can be made from suitable sheet metal and have suitable seam construction.

Brasier-fire blower air-pump cylinder 105, cylinder cap 111, cylinder bottom 108 and air jet 109 can be made of suitable steel. Air-pump piston 113, rod 117 and grip 118 can be made of suitable material.

FIGURES 24, 25 and 28 show a removable food cover 142 supported in a food holder 150, and the food cover removed from the food holder is shown in FIGURE 30. The food cover has a lower rim 147 shown in FIGURES 30 and 34, a handle 148, a through vapor passageway 143 shown in FIGURES 28 and 34, a brasier casing seat 144 on the food cover around the vapor passageway through the food cover, which brasier casing seat is the upper surface of the food cover around the passageway 143 outward to the broken circle line 146 shown in FIGURE 28. The brasier casing seat has a raised central portion 145 shown in FIGURES 28 and 34.

Food holder 150 has a lower rim 151 with a turned-inward flange 152 shown in FIGURE 34, a removable perforated bottom 153 supported on the flange 152, an upper rim 156, a handle 157, and the food holder is supported on an annular inside ridge 164 in the wall 162 of the removable food holder support 160. The food holder support has a lower rim 161, an upper rim 165, an annular series of perforations 163 through the wall 162 between the ridge 164 and the lower rim 161, and a handle 166.

On the food cover shown in FIGURES 24, 25 and 34 is a removable brasier casing 170, and the brasier casing removed from the food cover is shown in FIGURES 31, 32 and 33. The brasier casing has a tubular handle 177 with a grip 178, an upper end 171 with a rim 172 shown in FIGURES 31 and 32, a lower end 173 shown in FIGURE 33, a bottom 174 with a through vapor passageway 176 shown in FIGURE 33, and in FIGURES 24, 25 and 34 the brasier casing lower end is seated on the brasier casing seat 144 with the passageway 176 adjacent to the passageway 143 through the food cover. The brasier casing bottom has a raised central portion 175 which covers the raised central portion 145 of the brasier casing seat 144 when the brasier casing lower end 173 is seated on the brasier casing seat.

In the brasier casing shown in FIGURES 24, 25, 31 and 34 is a brasier 180, and the brasier removed from the brasier casing is shown in FIGURES 35, 36 and 37.

The brasier has a lower end 182 with a bottom 183 shown in FIGURE 37, an upper end 184 with a rim 185 shown in FIGURE 31, a mouth 186 to receive gaseous-condiment generating material including air into the brasier and to emit gaseous condiment to flow under the food cover, and the brasier is supported and spaced in the brasier casing on spaced apart supports 187 and 187 which supports are attached rigid with the brasier by spot-welding the central portion of each support to the wall 181 of the brasier. The central portion of one of the brasier supports is indicated by a broken line 188 shown in FIGURE 36. A brasier casing cover 91 shown on the upper end of the brasier casing in FIGURES 24 and 34 has an upper face 93 and a through air jet inlet hole 97—97a over the bottom 183 of brasier 180. The upper face 93 of the brasier casing cover 91 on the brasier casing 170 is shown in FIGURE 25, and the brasier casing cover 91 not on a brasier casing is shown in FIGURE 9. Out of the brasier 180 to the vapor passageway 176 through the brasier casing bottom is a vapor passageway 190 shown in FIGURE 34. The two series of arrows 191 and 191 in the passageway 190 indicate the way vapor, gas or air, flows in the passageway 190 to and through the passageways 176 and 143.

Brasier-fire blower 193 shown in FIGURES 24, 26, 27 and 34 includes a hollow squeeze bulb 194, and an air jet 198. The squeeze bulb has a lower neck 195 and an upper neck 196. In the lower squeeze bulb neck is a bushing 197 screwthreaded on the upper end 199 of the air jet, and the perforated end 203 of a handle 202 on the threaded upper end of the air jet is clamped between the lower end of the bushing 197 and an annular shoulder 200 on the air jet. In the upper squeeze bulb neck 196 is an air inlet valve housing 205 which latter has an air inlet hole 206, a ball valve seat 207, and a ball valve 208 in the valve housing is blown against the valve seat to close the air inlet hole 206 when the bulb 194 is squeezed with the hand to force air out of the bulb through the air jet orifice 201. Shown in FIGURE 24, the brasier-fire blower extends over the upper face of brasier casing cover 91 on brasier casing 170, and the brasier-fire blower has the downturned air jet 198 in the air jet inlet hole 97a—97 through the brasier casing cover shown in FIGURE 34.

Brasier-fire blower 193 can be held in the position shown in FIGURE 24 with one hand gripped on handle grip 204 while the other hand has hold of the squeeze-bulb to blow air from the air jet 198 by alternately squeezing and releasing the squeeze pressure on the squeeze-bulb. By squeeze-pumping the brasier-fire blower, air can be blown into ignited gaseous-condiment generating material 210 shown in FIGURE 34 in brasier 180. The series of arrows 211 indicate the way air blows from the air jet orifice 201 to the ignited material 210 in the brasier, and the two series of arrows 191 and 191 indicate the way generated gaseous condiment flows out of the brasier to and through the vapor passageways 176 and 143 and under the food cover 142 where some of the gaseous condiment will be absorbed on food supported on the perforated bottom 153 of the food holder 150. As gaseous condiment flows by the air feed pressure through the passageways 176 and 143 and under the food cover, air inclosed under the food cover can escape through some of the food-holder bottom perforations 154 and perforations 163 through the wall of the food holder support 160.

A gaseous-condiment generating material which can be ignited and put in the brasier 180 is charcoal carefully made from wood suitable for burning to smoke meat for food and reduced to pieces of suitable size to measure up a charge for the small brasier. Fried pieces of potato or fried potato chips, popped and buttered pop-corn, or pieces of fried food, can be put under food cover 142 on the perforated bottom 153 in food holder 150 and given burning-charcoal gas flavor from suitable charcoal burned in the brasier. Pieces of raw meat, fowl or fish, pieces of pork fat to go in pork sausage, or pieces of beef fat to go in ground beef, can be put in the food holder under the food cover and given a smoky flavor from suitable wood burned in the brasier. A food holder bottom having small closely spaced perforations can be put in the food holder in the place of bottom 153 and dry beans can be put in the food holder under the food cover and given a mild heated-earth flavor from dry suitable earth put in the brasier and heated with burning charcoal.

Dry suitable earth in the form of balls, cakes, pieces or extruded short sticks, can be put in the food holder 150 on the perforated bottom under the food cover 142 and given a smoky flavor from suitable wood burned in the brasier 180. The smoked earth can be heated with burning charcoal in the brasier to flavor cooked food supported on the perforated bottom 153 under the food cover.

The perforated bottom 153 can be removed from the food holder 150 and thin cotton cloth of suitable size can be stretched under the food holder for a cloth bottom to support a layer of shortening ladened corn meal, rice meal, wheat meal or flour under the food cover 142 to receive a smoky flavor from suitable dry wood burned in brasier 180. In inserting a cloth bottom, the food holder can be removed from the support 160 and a bottom cloth can be spread over the upper rim 165 of the support, the food holder lower rim 151 can be placed on the spread bottom cloth and forced down in the support 160 to the annular ridge 164 to stretch and secure the bottom cloth in place. There is enough annular space 167 between the food holder and the support wall 162 to receive the upturned portion of a bottom cloth stretched under the lower rim of the food holder.

Food cover 142, brasier casing 170 and handle 177, brasier 180 and supports 187—187 can be made of suitable steel or stainless steel. Grip 178 can be made of suitable plastic or heat insulating material. Air jet 198, bushing 197 and handle 202 can be made of suitable metal. Squeeze-bulb 194 can be made of suitable odorless rubber or suitable odorless plastic. Valve housing 205 can be made of suitable plastic or metal, and ball valve 208 can be made of suitable plastic, glass or metal. Food holder 150 and bottom 153, and support 160 can be made of suitable steel or stainless steel. Handles 148, 157, 166 and grip 204 can be made of suitable plastic.

Food cover 142, brasier casing 170 and brasier 180 are made seamless, but a useful food cover, brasier casing, or brasier, can be made from suitable sheet metal and have suitable seam construction.

FIGURE 42 shows a brasier casing 220 on a food cover 214 around a vapor passageway 215 through the food cover, and the brasier casing is rigid with the food cover. The brasier casing has an upper end 221 with a rim 222, a flanged lower end 223 shown in FIGURES 38 and 44, and the flange 224 is spot-welded to the food cover around the passageway 215. On the upper end of the brasier casing shown in FIGURE 38 is a removable brasier casing cover 226 also shown in FIGURE 39, and the brasier casing cover removed from the brasier casing is shown in FIGURE 43. The brasier casing cover has a handle 231 with a grip 232, a through air jet inlet hole 230, an upper face 228, an under face 227 which fits closely on the upper end of the brasier casing, and a downturned edge portion 229 to aid in locating the cover on the upper end of the brasier casing. In the brasier casing shown in FIGURES 38 and 41 is a removable brasier 180 and a brasier 180 not in a brasier casing is shown in FIGURES 35, 36 and 37. Shown in FIGURE 41, the brasier is supported and spaced in the brasier casing on supports 187 and 187. As the brasier casing cover is shown in FIGURES 38, 39 and 44, the upper face 228 and the air jet inlet hole 230 are over the bottom 183 of brasier 180. Out of the brasier to the vapor passageway 215 through the food cover is a vapor passageway 235 shown in FIGURE 44. The two series of arrows 236 and 236 in the passageway 235 indicate the way vapor, gas or air, flows in the passageway 235 to and through the passageway 215.

Food cover 214 has a lower rim 216 and the food cover is shown in FIGURES 38 and 39 supported on a flat food plate 237 with a sheet of absorbent paper 238 between the food cover and the plate. Spaced apart knobs 217 and 217 on the food cover can be gripped with the hands in placing the food cover on the plate, which plate can be placed on a table or other suitable support.

Brasier-fire blower 240 shown in FIGURES 38, 40 and 44 includes an electric motor driven rotary fan 250 shown in FIGURE 44, and an air jet 246. The fan includes an annular series of spaced apart fan blades 252 rigid with the fan disk 251 which latter is rigid with the motor drive shaft 256. The fan is inclosed in a two-section 241—249 fan case, and the fan case is rigid with the motor case 254 at the drive shaft end 255. The larger section 241 of the fan case has air inlet holes 243 and 243, a throttle valve 244 for the air inlet holes which are shown in FIGURE 45, an upper hand grip 245, and the air jet has an upper end 247 screwthreaded into the fan case lower end 242. On the electric motor 253 is a hand grip 257, and the electric current conductor cord 259 has suitable length and is provided with a plug cap 260 for inserting in a near by electric current outlet. Shown in FIGURE 38, the brasier-fire blower extends over the upper face 228 of the brasier casing cover 226, and the brasier-fire blower has the downturned air jet 246 in the air jet inlet hole 230 through the brasier casing cover shown in FIGURE 44.

With cord plug cap 260 inserted in a suitable electric current outlet, brasier-fire blower 240 can be held in the position shown in FIGURE 38 with one hand gripped on grip 245 while the other hand has hold of grip 257, and electric current can be switched on the motor 253 with switch 258 to drive the fan 250 to blow air through the air jet orifice 248 into ignited gaseous-condiment generating material 263 shown in FIGURE 44 in brasier 180. The series of arrows 264 indicate the way air blows from the air jet 246 to the ignited material 263 in the brasier, and the two series of arrows 236 and 236 indicate the way generated gaseous condiment flows out of the brasier to and through the vapor passageway 215 through the food cover 214. The food cover as shown in FIGURES 38 and 39 is vented with a pin 239 inserted between the sheet of paper 238 on the plate 237 and the food cover rim 216. Thus vented, air inclosed under the food cover can escape between the food cover rim and the paper as gaseous condiment flows by air feed pressure through the passageway 215 and under the food cover onto cooked food 265 placed on the paper under the food cover where some of the gaseous condiment will be absorbed on the cooked food. A gaseous-condiment generating material which can be ignited and put in the brasier is charcoal carefully made from wood suitable for burning to smoke meat for food and reduced to pieces of suitable size to measure a charge to be ignited to go in the brasier. Smoky flavor can be given raw meat placed on butcher paper under the food cover by burning suitable wood in the brasier.

Food cover 214, brasier casing 220 and brasier casing cover 226, and air jet 246 can be made of suitable steel or made of stainless steel. Fan 250 can be made of suitable cast iron or suitable steel. Fan case sections 241—249 can be made of suitable cast iron. Throttle 244 can be made of suitable steel. Grips 245, 257 and knobs 217—217 can be made of suitable plastic, and grip 232 can be made of suitable plastic or suitable heat insulating material.

Funnel 268, shown in FIGURE 46, has a small end 269 which can be put in the mouth of the brasier when the brasier casing cover is removed, and gaseous-condiment generating material can be poured through the funnel into the brasier without taking the brasier out of the brasier casing. The funnel can be made of stainless steel or other suitable metal. A useful funnel can be made of suitable sheet metal and have suitable seam construction.

I claim:

1. In a gaseous-condiment generator, a food cover, a vapor passageway through said food cover, a brasier casing seat on said food cover around said vapor passageway through said food cover, a removable brasier casing on said food cover, said brasier casing having a lower end with a rim and an upper end with a rim, the lower end of said brasier casing seated on said brasier casing seat, a brasier in said brasier casing, said brasier having a bottom, said brasier supported and spaced in said brasier casing, a removable brasier casing cover on the upper end of said brasier casing, said brasier casing cover having an upper face over the bottom of said brasier, a vapor passageway out of said brasier to said vapor passageway through said food cover, an air-jet inlet hole through said brasier casing cover, said air-jet inlet hole through said brasier casing cover located over the bottom of said brasier, a brasier-fire blower, said brasier-fire blower extending over the upper face of said brasier casing cover, and said brasier-fire blower having a downturned air-jet in said air-jet inlet hole through said brasier casing cover.

2. In a gaseous-condiment generator, a food cover, a vapor passageway through said food cover, a brasier casing seat on said food cover around said vapor passageway through said food cover, a removable brasier casing on said food cover, said brasier casing having a lower end and an upper end, a rim at the upper end of said brasier casing, a brasier casing bottom at the lower end of said brasier casing, the lower end of said brasier casing seated on said brasier casing seat, a vapor passageway through said brasier casing bottom adjacent to said vapor passageway through said food cover, a brasier in said brasier casing, said brasier having a bottom, said brasier supported and spaced in said brasier casing, a removable brasier casing cover on the upper end of said brasier casing, said brasier casing cover having an upper face over the bottom of said brasier, a vapor passageway out of said brasier to said vapor passageway through said brasier casing bottom, an air-jet inlet hole through said brasier casing cover, said air-jet inlet hole through said brasier casing cover located over the bottom of said brasier, a brasier-fire blower, said brasier-fire blower extending over the upper face of said brasier casing cover, and said brasier-fire blower having a downturned air-jet in said air-jet inlet hole through said brasier casing cover.

3. In a gaseous-condiment generator, a food cover, a vapor passageway through said food cover, a brasier casing on said food cover around said vapor passageway through said food cover, said brasier casing rigid with said food cover and having an upper end with a rim, a brasier in said brasier casing, said brasier having a bottom, said brasier supported and spaced in said brasier casing, a removable brasier casing cover on the upper end of said brasier casing, said brasier casing cover having an upper face over the bottom of said brasier, a vapor passageway out of said brasier to said vapor passageway through said food cover, an air-jet inlet hole through said brasier casing cover, said air-jet inlet hole through said brasier casing cover located over the bottom of said brasier, a brasier-fire blower, said brasier-fire blower extending over the upper face of said brasier casing cover, and said brasier-fire blower having a downturned air-jet in said air-jet inlet hole through said brasier casing cover.

References Cited in the file of this patent
UNITED STATES PATENTS

| | | |
|---|---|---|
| 2,205,914 | Stafford | June 25, 1940 |
| 2,243,093 | Flahive | May 27, 1941 |
| 2,246,804 | Lipschutz | June 24, 1941 |
| 2,591,072 | Hughes | Apr. 1, 1952 |
| 2,984,171 | Lee | May 16, 1961 |

FOREIGN PATENTS

| | | |
|---|---|---|
| 772,887 | France | Apr. 20, 1934 |